(12) United States Patent
Chang et al.

(10) Patent No.: US 10,237,091 B2
(45) Date of Patent: Mar. 19, 2019

(54) PARALLEL SCHEDULING METHOD AND SYSTEM FOR NETWORK DATA TRANSMISSION

(71) Applicant: INDUSTRIAL TECHNOLOGY RESEARCH INSTITUTE, Hsinchu (TW)

(72) Inventors: Shu-Hsin Chang, Tainan (TW); Kun-Hsien Lu, Kaohsiung (TW); Chun-Yu Chuang, Changhua (TW); Shih-Yu Liu, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 599 days.

(21) Appl. No.: 14/578,790

(22) Filed: Dec. 22, 2014

(65) Prior Publication Data

US 2015/0326633 A1    Nov. 12, 2015

(30) Foreign Application Priority Data

May 12, 2014   (TW) .............................. 103116698 A

(51) Int. Cl.
  *G06F 15/16*   (2006.01)
  *H04L 12/64*   (2006.01)
  (Continued)

(52) U.S. Cl.
  CPC .......... *H04L 12/6418* (2013.01); *H04L 65/60* (2013.01); *H04L 67/104* (2013.01); *H04L 67/108* (2013.01)

(58) Field of Classification Search
  CPC ... H04L 12/6418; H04L 65/60; H04L 67/104; H04L 67/108; H04L 2209/60;
  (Continued)

(56) References Cited

U.S. PATENT DOCUMENTS

| 5,926,649 A | 7/1999 | Ma et al. |
| 7,970,932 B2 | 6/2011 | Liu et al. |

(Continued)

FOREIGN PATENT DOCUMENTS

| CN | 102833294 A | 12/2012 |
| CN | 102970232 A | 3/2013 |

(Continued)

OTHER PUBLICATIONS

Taiwan Patent Office, Office Action, Patent Application No. TW103116698, dated Jan. 13, 2016, Taiwan.

(Continued)

*Primary Examiner* — Oscar A Louie
*Assistant Examiner* — Oluwatosin M Gidado
(74) *Attorney, Agent, or Firm* — Rabin & Berdo, P.C.

(57) ABSTRACT

According to one exemplary embodiment, a parallel scheduling method for network data transmission is provided. This method generates a corresponding modulus condition set for each weight in a weight set, with each modulus condition of the modulus condition set having a modulus operation, and a divisor and a remainder for the modulus operation, uses a network node to transmit the modulus condition set corresponding to said each weight to a transmitting node corresponding to the weigh. Based on the modulus condition set, the transmitting node transmits a plurality of data chunks, and at least one receiving node receives the plurality of data chunks, wherein each data chunk corresponding to a sequence number, and the sequence number matches a corresponding modulus condition in the modulus condition set.

19 Claims, 15 Drawing Sheets

(51) Int. Cl.
*H04L 29/06* (2006.01)
*H04L 29/08* (2006.01)

(58) Field of Classification Search
CPC ..... H04L 63/0428; H04L 63/12; H04L 67/06; H04L 69/329; H04L 9/3236; H04L 47/10; H04L 1/1809; H04L 1/1819; H04L 12/2801
USPC .................................................. 709/219, 217
See application file for complete search history.

(56) References Cited

U.S. PATENT DOCUMENTS

| | | | |
|---|---|---|---|
| 8,326,992 | B2 | 12/2012 | Luzzatti et al. |
| 2003/0002533 | A1 | 1/2003 | Rajwan |
| 2007/0011570 | A1 | 1/2007 | Jeong et al. |
| 2007/0217450 | A1 | 9/2007 | Inagaki et al. |
| 2010/0023633 | A1 | 1/2010 | Fu et al. |
| 2010/0142376 | A1* | 6/2010 | Lou .................... H04L 47/10 370/236 |
| 2010/0146138 | A1* | 6/2010 | Ng ...................... H04L 65/80 709/231 |
| 2012/0029911 | A1 | 2/2012 | Noh et al. |
| 2012/0110609 | A1 | 5/2012 | Guo et al. |
| 2012/0278321 | A1* | 11/2012 | Traub ............. G06F 17/30657 707/736 |
| 2013/0073691 | A1* | 3/2013 | Quan .................. H04L 67/06 709/219 |
| 2013/0091294 | A1 | 4/2013 | El-Beltagy et al. |
| 2015/0161174 | A1* | 6/2015 | Kumar ............... G06K 9/6224 707/769 |

FOREIGN PATENT DOCUMENTS

| | | |
|---|---|---|
| TW | 201025938 A | 7/2010 |
| TW | 201123778 A | 7/2011 |

OTHER PUBLICATIONS

Li et al., Towards low-redundancy push-pull P2P live streaming, Proceedings of the 5th International ICST Conference on Heterogeneous Networking for Quality, Reliability, Security and Robustness, 2008.

Alghazawy et al., Probabilistic Packet Scheduling Scheme for Hybrid Pull-Push P2P Live Streaming Protocols, The Second International Conference on Networking and Computing (ICNC), 2011, pp. 248-251.

W. Guofu et al., Towards Low Delay Sub-Stream Scheduling, International Journal of Computers, Communications & Control (IJCCC), 2010, pp. 727-734.

Li et al., Understanding Sub-stream Scheduling in P2P Hybrid Live Streaming Systems, IEEE Infocom, 2010, pp. 1-5.

Liu et al., Substream Trading: Towards an Open P2P Live Streaming System, IEEE International Conference on Network Protocols, 2008, pp. 94-103.

Li et al., A Unified Framework for Sub-stream Scheduling in P2P Hybrid Streaming Systems and How to Do Better? Lecture Notes in Computer Science, vol. 5550, 2009 pp. 728-741.

Chinese Office Action dated Oct. 23, 2017.

* cited by examiner

FIG. 4B

| $N_1+N_2+N_3+N_4$ | $N_3$ | $N_2$ | $N_3$ | $N_1$ | $N_4$ | $N_2$ | $N_1$ | $N_1$ | $N_2$ | $N_2$ | $N_3$ | $N_1$ | $N_4$ | $N_2$ | $N_1$ | $N_1$ |

FIG. 8A

| Weight factor \ Weight | 1/3 | 1/9 | 1/18 |
|---|---|---|---|
| $w_1 = 11/18$ | 1 | 2 | 1 |
| $w_2 = 7/18$ | 1 | 0 | 1 |

| s mod 3=2 |
|---|
| s mod 3=1 |
| s mod 3=0 |

822:

| s mod 9=6 |
|---|
| s mod 9=3 |
| s mod 9=0 |

823:

| s mod 18=9 |
|---|
| s mod 18=0 |

FIG. 8C

| Weight | Modulus condition set |
|---|---|
| $w_1$ | { s mod 3=2, s mod 9 = 3, s mod 9=6, s mod 18=9 } |
| $w_2$ | { s mod 3=1, s mod 18 = 0 } |

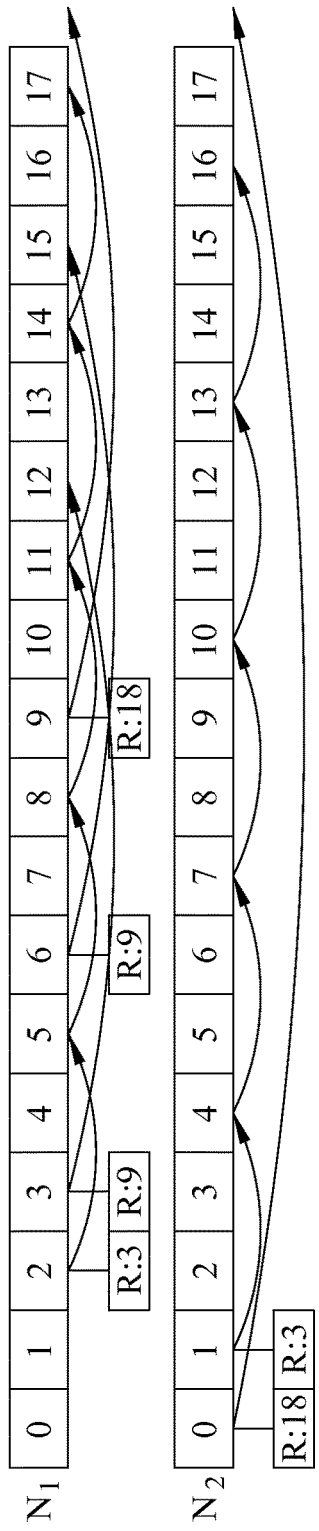

PARALLEL SCHEDULING METHOD AND SYSTEM FOR NETWORK DATA TRANSMISSION

CROSS-REFERENCE TO RELATED APPLICATION

The present application is based on, and claims priority from, Taiwan Patent Application No. 103116698 filed on May 12, 2014, the disclosure of which is hereby incorporated by reference herein in its entirety.

TECHNICAL FIELD

The technical field generally relates to a parallel scheduling method and system for network data transmission.

BACKGROUND

Network bandwidth is a key factor affecting the quality of video streaming services. In various peer-to-peer (P2P) applications, such as, multimedia live streaming, real-time communication, file transmission, etc., the nodes with insufficient upload bandwidth are unable to share data to other nodes. If the upload bandwidth of each node can be fully utilized, the costs of both system deployment and network bandwidth may be reduced. In multimedia streaming service applications, the network nodes simultaneously perform of stream data uploading and downloading, that is, to receive stream data from a stream source and exchange the stream data with other nodes. The scheme of data exchange depends on the network topology formed among the nodes. Some of the main P2P network topologies are tree-based, mesh-based, and cluster-based.

The tree-based P2P network topology may be divided into single-tree topology and multi-tree topology. The single-tree topology uses the stream source as the root node. Each node receives stream data from its parent node and pushes data to its child nodes. The maximum number of child nodes is determined by the upload bandwidth of the node. In the single-tree topology, a leaf node has no child node, and therefore cannot contribute its upload bandwidth, which reduces the overall bandwidth utilization of the system. The multi-tree topology solves the bandwidth waste of the leaf nodes in the single-tree topology. In the multi-tree topology, the root node divides the stream data into a plurality of sub-streams, and each sub-stream is pushed to all nodes through different sub-tree. Each node is added to all the sub-trees and acts as an internal node or a leaf node in each of the sub-trees, thereby each node may contribute its upload bandwidth. In the multi-tree topology, any node leaving the network may change the topologies of all sub-trees. The nodes connected to this node in each sub-tree are re-connected to other nodes. In general, the tree-based topology is suitable for delay-sensitive applications for smaller transmission delay.

In the mesh P2P network topology, the nodes exchange data in a pull manner. When a node is added to a streaming network, the node obtains a list of some nodes from the server, such as tracker, and establishes a neighboring relationship and exchanges buffer map (BM) information with these nodes. The BM information records the information of stream data chunks kept in a node so far. As such, the node may determine which neighboring nodes own the data chunks, and may use a scheduling mechanism to request required data chunks from the neighboring nodes. In the mesh P2P network topology, each node may have an opportunity to contribute its upload bandwidth, and when a neighboring node leaves the network, each node may still receive stream data from other neighboring nodes. Since every node in the mesh topology may request data chunks from different nodes, the data chunks are not necessarily arriving the node in order. This may cause apparent data transmission delay in mesh topology networks. In general, mesh topology is suitable for network environments with frequent changes of member nodes.

In the cluster-based P2P network topology, the nodes in the network are divided into a plurality of clusters. Each cluster includes one or more nodes. Each cluster has a node acting as a cluster head. The stream data is aggregated by the cluster head or some designated cluster node from stream source or other cluster nodes, and then distribute to other nodes in the cluster. The connection among the cluster heads and the connection among the nodes within a cluster may use either tree-based topology or mesh topology. In the cluster-based topology, the impact of the node joining or leaving a network on the load balance, the selection of the cluster head, and optimal number of nodes in a cluster are all research issues.

Some researches on stream data propagation combine the aforementioned push and pull approaches. When a node joins a streaming network, the node uses a pull approach to request stream data from the neighboring nodes. After that, the node selects a neighboring node as a parent node and the selected parent node pushes the stream data to the node to achieve the real-time feature in the stream data propagation. When the node misses a stream data because of packet loss, the node uses the pull approach again to request the stream data from its neighboring node.

Some of the known P2P network technologies use sub-stream scheduling method to alleviate the waste of upload bandwidth in sharing data. The sub-stream scheduling method divides the stream into k sub-streams of the same size and distributes the k sub-streams to the P2P network. Each neighboring node may own a plurality of different sub-streams, and each sub-stream includes different stream data chunks. For example, the first sub-stream includes the $1^{st}$, the $(k+1)^{th}$, the $(2k+1)^{th}$, the $(3k+1)^{th}$, ..., etc., chunks; the second sub-stream includes the $2^{nd}$, the $(k+2)^{th}$, the $(2k+2)^{th}$, the $(3k+2)^{th}$, ..., etc., chunks; and the k-th sub-stream includes the $k^{th}$, the $(2k)^{th}$, the $(3k)^{th}$, the $(4k)^{th}$, ... etc., chunks, and so on. A node selects some suitable nodes from these neighboring nodes (such as, the neighboring nodes with a minimum delay and a maximum match) to receive all the sub-streams to merge into a complete stream. The above method performs a rescheduling mechanism when the neighboring nodes are unable to provide sufficient sub-streams. A key point in the scheduling design is to determine the value of k. When k is too small, the nodes may not be able to completely contribute their upload bandwidth; while when k is too large, the computation complexity of the sub-stream scheduling mechanism is increased.

SUMMARY

The embodiments of the present disclosure provide a parallel scheduling method and system for network data transmission.

An exemplary embodiment relates to a parallel scheduling method for network data transmission. The method may comprise: generating a corresponding modulus condition set for each weight in a weight set, with each modulus condition of the modulus condition set having a modulus operation, and a divisor and a remainder for the modulus operation;

using a network node to transmit the modulus condition set corresponding to said each weight to a transmitting node corresponding to the weigh; based on the modulus condition set, transmitting, by the transmitting node, a plurality of data chunks, wherein each data chunk corresponds to a sequence number, and the sequence number matches a corresponding modulus condition in the modulus condition set; and receiving, by at least one receiving node, the plurality of data chunks.

Another embodiment relates to a parallel scheduling system for network data transmission. The system may comprise a network node. The network node generates a corresponding modulus condition set for each weight in a weight set, with each modulus condition of the modulus condition set having a modulus operation, and a divisor and a remainder for the modulus operation; transmits the modulus condition set corresponding to said each weight to a transmitting node corresponding to the weigh and uses a storage medium to store and maintain a plurality of modulus condition sets generated by the network node; wherein, based on the modulus condition set, the transmitting node transmits a plurality of data chunks to one or more receiving nodes, wherein each data chunk corresponds to a sequence number, and the sequence number matches a corresponding modulus condition in the modulus condition set.

The foregoing will become better understood from a careful reading of a detailed description provided herein below with appropriate reference to the accompanying drawings.

BRIEF DESCRIPTION OF THE DRAWINGS

FIGS. 4A-4B show an exemplar of transmitting a sub-stream based on the modulus condition set, in accordance with an exemplary embodiment.

FIGS. 8A-8E show an exemplar from generating the modulus condition set based on weight set to transmitting sub-streams based on the modulus condition set, in accordance with an exemplary embodiment.

DETAILED DESCRIPTION OF THE DISCLOSED EMBODIMENTS

Figure 1:
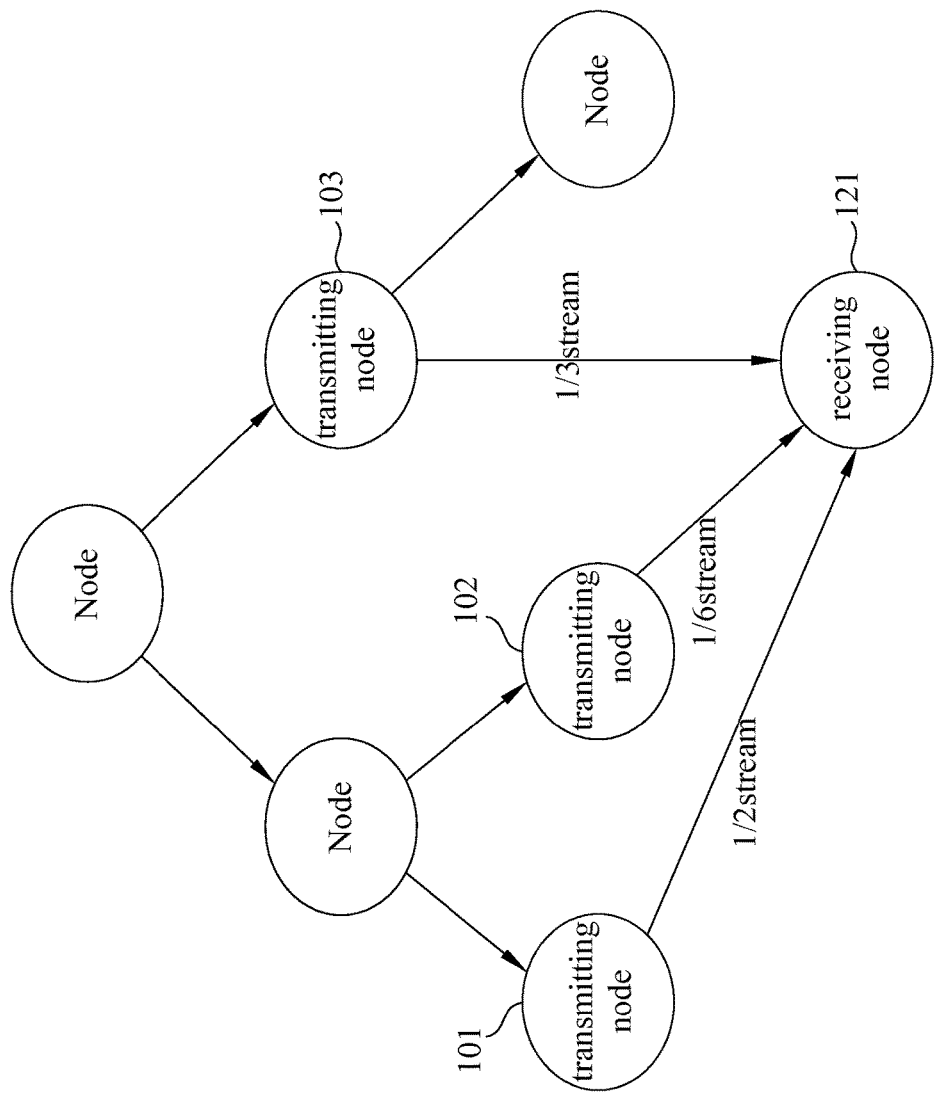
FIG. 1 shows a schematic view illustrating an application scenario of network data parallel transmission in a P2P network, in accordance with an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to the exemplary embodiments of the disclosure, a parallel scheduling technique for network data transmission is provided. The technique utilizes a plurality of modulus conditions to define sequence numbers of the data chunks in each individual sub-stream, generates a modulus condition set according to a weight ratio of the sub-stream, and transmits the sub-streams according to the modulus condition set. This technique may utilize a plurality of transmitting nodes to transmit sub-streams in parallel, and the receiving node may integrate all the sub-streams into a complete stream, thereby the upload bandwidths of the network nodes may be fully utilized for data sharing. The above sub-stream is formed by all the data chunks with their sequence numbers matching a specific modulus condition.

FIG. 1 shows a schematic view illustrating an application scenario of network data parallel transmission in a P2P network, in accordance with an exemplary embodiment. Referring to FIG. 1, a P2P network 100 may have a plurality of transmitting nodes (such as, transmitting nodes 101-103) and at least one receiving node (such as, a receiving node 121). In the embodiment, the transmitting node 101, transmitting node 102 and transmitting node 103 transmit in parallel sub-streams to the receiving node 121. The receiving node 121 integrates the ½ sub-stream transmitted by the transmitting node 101, the ⅙ sub-stream transmitted by the transmitting node 102 and the ⅓ sub-stream transmitted by the transmitting node 103 to become a complete stream. As seen from FIG. 1, the receiving node 121 may obtain the sub-streams from a plurality of leaf nodes or internal nodes. The sub-stream data transmitted by each transmitting node is not repetitive and all the sub-stream data are integrated to form a complete stream at the receiving node 121. In other words, the complete stream=½ sub-stream+⅙ sub-stream+⅓ sub-stream.

Figure 2:
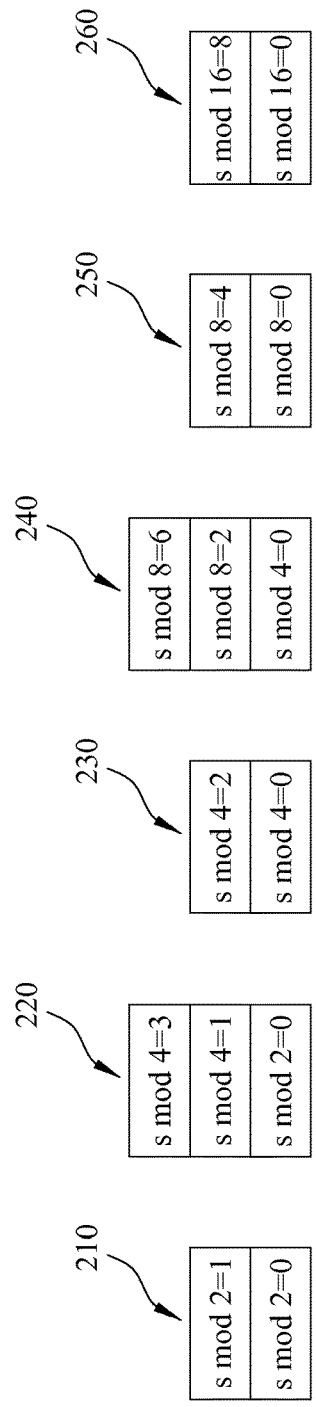
FIG. 2A shows an exemplar of transforming the weight into a linear combination of weight factors, in accordance with an exemplary embodiment.
FIG. 2B shows an exemplar of using a stack to record the modulus conditions not yet assigned to any modulus condition set, in accordance with an exemplary embodiment.
FIG. 2C shows an exemplar of generating a modulus condition set corresponding to each weight, in accordance with an exemplary embodiment.

According to the exemplary embodiments of the disclosure, the generation of modulus condition sets based on a weight set of the sub-streams may include decomposing the modulus condition based on the factors of a denominator of the weight, using a register to record unassigned modulus conditions, and generating a modulus condition set corresponding to each weight. According to the exemplary embodiments, transmitting the sub-stream based on the modulus condition set may include generating a corresponding index for each modulus condition, determining an initial position of an index based on a remainder of the modulus condition, and determining a shift distance based on a divisor, and transmitting the data chunks to a corresponding receiving node based on the index. FIGS. 2A-2C show an exemplar of generating a modulus condition set, in accordance with an embodiment.

FIG. 2A shows an exemplar of transforming the weight into a linear combination of weight factors, in accordance with an exemplary embodiment. Referring to FIG. 2A, assume that the common weight denominator of the weights is 16, and the weights corresponding to the four nodes $N_1$, $N_2$, $N_3$, $N_4$ are $w_1=6/16$, $w_2=5/16$, $w_3=3/16$, $w_4=2/16$, respectively. The weight factors are defined according to a factor decomposition result of the weight denominator. The four factors of the weight denominator in this exemplar are all 2, and therefore the first weight factor is defined as ½, the second weight factor is defined as ¼, the third weight factor is defined as ⅛ and the fourth weight factor is defined as 1/16. Then, each weight is transformed into a linear combination of these weight factors, and is obtained as $w_1=1\times(¼)+1\times(⅛)$, $w_2=1\times(¼)+1\times(1/16)$, $w_3=1\times(⅛)+1\times(1/16)$, $w_4=1\times(⅛)$, respectively, as shown in FIG. 2A.

According to an exemplary embodiment of the disclosure, in the process of generating the modulus condition set, a storage space in a storage medium may be used to record the yet unassigned modulus conditions, such as, with a stack or a queue to record the yet unassigned modulus conditions. The exemplar of using a stack is shown in FIG. 2B. Take the above exemplar in FIG. 2A as an example, in FIG. 2B, a positive integer space is decomposed according to the first factor (2) into two positive integer sub-spaces S1 and S2, wherein S1={s|s is a positive integer, and s mod 2=0}, S2={s|s is a positive integer, and s mod 2=1}, and the two first-order modulus conditions (i.e. s mod 2=0, and s mod 2=1) are pushed into a stack 210. Then, a first-order modulus condition (i.e. s mod 2=1) is popped up from the stack 210 to determine whether a weight has a coefficient of the first weight factor greater than 0; in this example, each weight has a coefficient as 0 for the first weight factor, and therefore the second factor (2) is used to decompose the s mod 2=1 into two second-order modulus conditions, i.e., s mod 4=1 and s mod 4=3, and the two new modulus conditions are pushed into the stack 210 to become a stack 220.

Then, a second-order modulus condition, i.e. s mod 4=3, is popped up from the stack 220. And then, determining the weight $w_1$ has a coefficient of the second weight factor as 1. Therefore, the modulus condition, i.e. s mod 4=3, is assigned to $w_1$, in other words, the modulus condition s mod 4=3 is added to a modulus condition set corresponding to the weight $w_1$, as shown in FIG. 2C, and the coefficient of the second weight factor of the weight $w_1$ is decreased by 1. Then, a second-order modulus condition, i.e. s mod 4=1, is popped up from the stack 220. Because the coefficient of the second weight factor of the weight $w_2$ is also 1, the modulus condition s mod 4=1 is added to the modulus condition set corresponding to the weight $w_2$, as shown in FIG. 2C, and the coefficient of the second weight factor of the weight $w_2$ is decreased by 1. Then, a first-order modulus condition s mod 2=0 is popped up from the stack 220.

Similarly, because each weight has a coefficient as 0 for the first weight factor, therefore the second factor (2) is used to decompose the s mod 2=0 into two second-order modulus conditions, i.e., s mod 4=0 and s mod 4=2, and the two new modulus conditions are pushed into a stack 230. Then, a second-order modulus condition, i.e. s mod 4=2, is popped up from the stack 230. At this point, because the coefficient of the second weight factor corresponding to each weight is 0, the third factor (2) is used to decompose the s mod 4=2 into two third-order modulus conditions, i.e., s mod 8=2 and s mod 8=6, and the two new modulus conditions are pushed into the stack 230 to become a stack 240. Then, the third-order modulus condition s mod 8=6 is popped up from the stack 240 to add to the modulus condition set corresponding to the weight $w_1$, and the coefficient of the third weight factor of the weight $w_1$ is decreased by 1. A third-order modulus condition, i.e. s mod 8=2, is popped up from the stack 240 to add to the modulus condition set corresponding to the weight $w_3$, and the coefficient of the third weight factor of the weight $w_3$ is decreased by 1, as shown in FIG. 2C. Then, a second-order modulus condition, i.e. s mod 4=0, is popped up from the stack 240. The third factor (2) is used to decompose the s mod 4=0 into two third-order modulus conditions, i.e., s mod 8=0 and s mod 8=4, and the two new modulus conditions are pushed into a stack 250. Then, a third-order modulus condition, i.e. s mod 8=4, is popped up from the stack 250 to add to the modulus condition set corresponding to the weight $w_4$, and the coefficient of the third weight factor of the weight $w_4$ is decreased by 1, as shown in FIG. 2C. Then, the third-order modulus condition s mod 8=0 is popped up from the stack 250. The fourth factor (2) is used to decompose the s mod 8=0 into two fourth-order modulus conditions, i.e., s mod 16=0 and s mod 16=8, and the two new modulus conditions are pushed into a stack 260. Finally, the fourth-order modulus conditions s mod 16=8 and s mod 16=0 are popped up from the stack 260 to add to the modulus condition sets corresponding respectively to the weight $w_2$ and the weight $w_3$, as shown in FIG. 2C, and the coefficient of the fourth weight factor of the weights $w_2$ and $w_3$ are decreased by 1.

Figure 3:
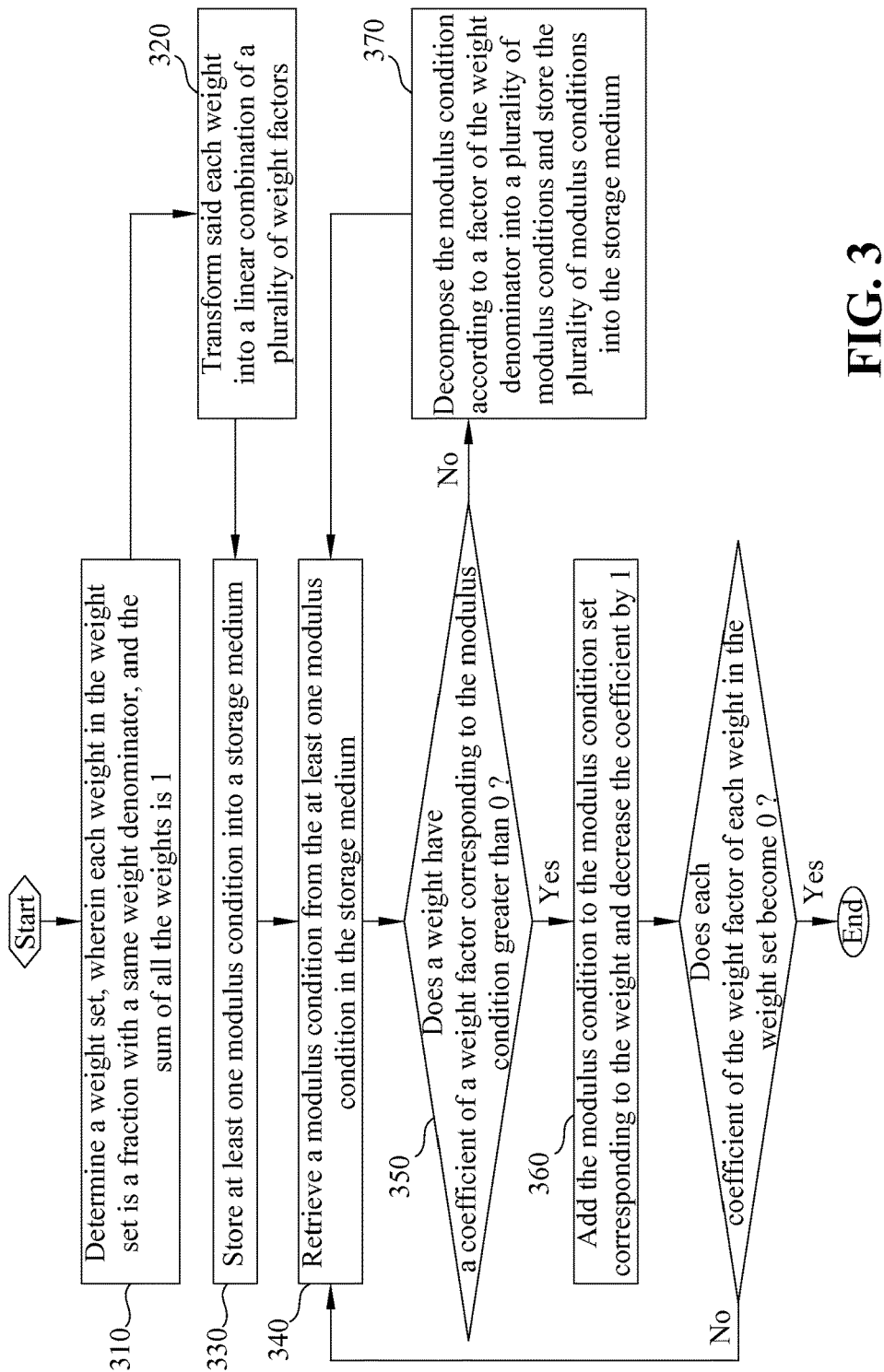
FIG. 3 shows an operation flow of generating the modulus condition set based on the weight ratio, in accordance with an exemplary embodiment.

Accordingly, FIG. 3 shows an operation flow of generating the modulus condition set based on the weight ratio, in accordance with an exemplary embodiment. In the operation flow of FIG. 3, a weight set is first determined, wherein each weight in the weight set is a fraction (i.e., a fractional number) with a same weight denominator, and the sum of all the weights is 1 (step 310). The weight denominator is a composite number; that is, the weight denominator is a multiplication of a plurality of factors. Then, said each weight is transformed into a linear combination of a plurality of weight factors (step 320). At least one modulus condition is stored into a storage medium (step 330), and a modulus condition is retrieved from the at least one modulus condition in the storage medium (step 340). When a weight has a coefficient of a weight factor corresponding to the modulus condition greater than 0 (step 350, Yes), the modulus condition is added to the modulus condition set corresponding to the weight and the coefficient is decreased by 1 (step 360). Otherwise, the modulus condition is decomposed according to a factor of the weight denominator into a plurality of modulus conditions and stored into the storage medium (step 370) and return to step 340. Repeat from step 340 to step 370, until each coefficient of the weight factor of each weight in the weight set becomes 0.

The aforementioned weight set may be determined by a set of ratio values. For example, the set of ratio values may include n ratio values, and the sum of all the ratio values is greater than 1, wherein the $i^{th}$ ratio value $q_i$ represents the ratio of the remaining available upload bandwidth $b_i$ of the $i^{th}$ transmitting node $N_i$ with respect to a streaming bit rate B, i.e., $q_i=b_i/B$. When determining a weight denominator D, a positive integer including a plurality of prime factors and satisfying the condition $\Sigma_{i=1}^{n}\lfloor D\cdot q_i\rfloor \geq D$ may be selected. For example, the ratio values of two transmitting nodes $N_1$ and $N_2$ are 0.49 and 0.52 respectively. When $D=2^k$, the minimum D may be selected as 64 that satisfies the condition ($\lfloor 0.49*64\rfloor+\lfloor 0.52*64\rfloor=31+33\geq 64$). The denominator of each weight $w_i$ of the above weight set is D, and the numerator is a positive integer. When determining $w_i$, $w_i \leq q_i$ may be selected.

Each aforementioned weight factor is a reciprocal of a first factor or the multiplication of a plurality of factors of the weight denominator. For example, a factorization of the weight denominator D is $D = \Pi_{x=1}^{X} f_x$, where $f_x$ is the $x^{th}$ factor of D, and then the $x^{th}$ weight factor is defined as $P_x = 1/\Pi_{y=1}^{x} f_y$, $\Pi$ is a consecutive multiplication operation, $\Pi_{y=1}^{x} f_y$ is the multiplication of the first factor $f_1, \ldots$ and the $x^{th}$ factor $f_x$. In other words, the plurality of factors of the weight denominator D is expressed as from the first factor to the $x^{th}$ factor, and $X \geq 2$. The aforementioned plurality of weight factors is expressed as from the first weight factor to the $X^{th}$ weight factor, $X \geq 2$. When x=1, the first weight factor $P_1 = 1/f_1$; when $2 \leq x \leq X$, the $x^{th}$ weight factor $P_x$ is the reciprocal of the multiplication from the first factor to the $x^{th}$ factor.

The aforementioned expressing each weight as a linear combination of a plurality of weight factors means to express the weight $w_i$ as $w_i = \Sigma_{x=1}^{X} a_{i,x} P_x$, wherein $a_{i,x}$ is a positive integer indicating the coefficient of the weight $w_i$ corresponding to the $x^{th}$ weight factor $P_x$, and $0 \leq a_{i,x} \leq f_x - 1$. When computing a coefficient of a weight corresponding to each weight factor, the computation may start with x=1, and sequentially taking the $a_{i,x}$ as the integer part of $t_{i,x} \times f_x$, i.e., $a_{i,x} = \lfloor t_{i,x} f_x \rfloor$, wherein $t_{i,x}$ is the fractional part of $t_{i,x-1}$, i.e., $t_{i,x} = t_{i,x-1} - \lfloor t_{i,x-1} \rfloor$, and $t_{i,1} = w_i$. For example, when the weight denominator is 18, the three factors are $f_1 = 3$, $f_2 = 3$, and $f_3 = 2$, respectively. Given that the weight $w_i = 11/18$, to express $w_i$ as a linear combination of the weight factors, assume $t_{i,1} = 11/18$, then $a_{i,1} = 1$ is the integer part of $t_{i,1} \times f_1 = (11/18) \times 3 = 1\frac{5}{6}$, $t_{i,2} = 5/6$ is the fractional part. Then, $a_{i,2} = 2$ is the integer part of $t_{i,2} \times f_2 = (5/6) \times 3 = 5/2$, $t_{i,3} = 1/2$ is the fractional part. Finally, $a_{i,3} = 1$ is the integer part of $t_{i,3} \times f_3 = (1/2) \times 2 = 1$. Therefore, $w_i = 1 \times (1/3) + 2 \times (1/9) + 1 \times (1/18)$.

Each aforementioned modulus condition includes a modulus operation, a divisor and a remainder of the modulus operation, expressed as s mod d=r, where s covers the space of all the positive numbers which result in the remainder r under the modulus d operation. Each modulus condition corresponds to a weight factor. For example, if the divisor d of a modulus condition is $d = \Pi_{y=1}^{x} f_y$, the corresponding weight factor is $P_x$. For convenience of explanation, the modulus condition is referred to as the x-order modulus condition.

The decomposition of modulus condition according to a factor of the weight denominator is to decompose the original x-order modulus conditions into a plurality of (x+1)-order modulus conditions. The number of the plurality of (x+1)-order modulus conditions is equal to the $(x+1)^{th}$ factor $f_{x+1}$ of the weight denominator, the intersection of any two (x+1)-order modulus condition sets is an empty set, and the union of the positive integer spaces covered by all the (x+1)-order modulus conditions is equal to the positive integer space covered by the original x-order modulus condition. For example, in the exemplar of FIG. 2B, the original first-order modulus condition s mod 2=1 is decomposed into two second-order modulus conditions, i.e., s mod 4=1 and s mod 4=3, wherein the positive integer space covered by the modulus condition s mod 4=1 is S1={s|s is a positive integer, and s mod 4=1}, the positive integer space covered by the modulus condition s mod 4=3 is S2={s|s is a positive integer, and s mod 4=3}, S1∩S2=empty set, and S1∪S2={s|s is a positive integer, and s mod 2=1}. In other words, if the original x-order modulus condition is s mod d=r, and the $(x+1)^{th}$ weight factor of the weight denominator is $f_{x+1}$, the plurality of (x+1)-order modulus conditions after decomposition are s mod $(d \times f_{x+1})$=r, s mod $(d \times f_{x+1})$=r+d, s mod $(d \times f_{x+1})$=r+2d, $\ldots$, and s mod $(d \times f_{x+1})$=r+$(f_{x+1}-1) \times d$, respectively.

In other words, the plurality of (x+1)-order modulus conditions after decomposition include a plurality of modulus operations, and the plurality of modulus operations share a common divisor (i.e., $d \times f_{x+1}$), and each has a different remainder. The common divisor of the plurality of modulus conditions after decomposition is a multiplication of the divisor d and the $(x+1)^{th}$ factor $f_{x+1}$ of the weight denominator D. The plurality of different remainders form an arithmetic sequence starting with the remainder of the modulus operation of the x-order modulus condition and increases by the divisor of the modulus operation in the x-order modulus condition.

Figure 4A:
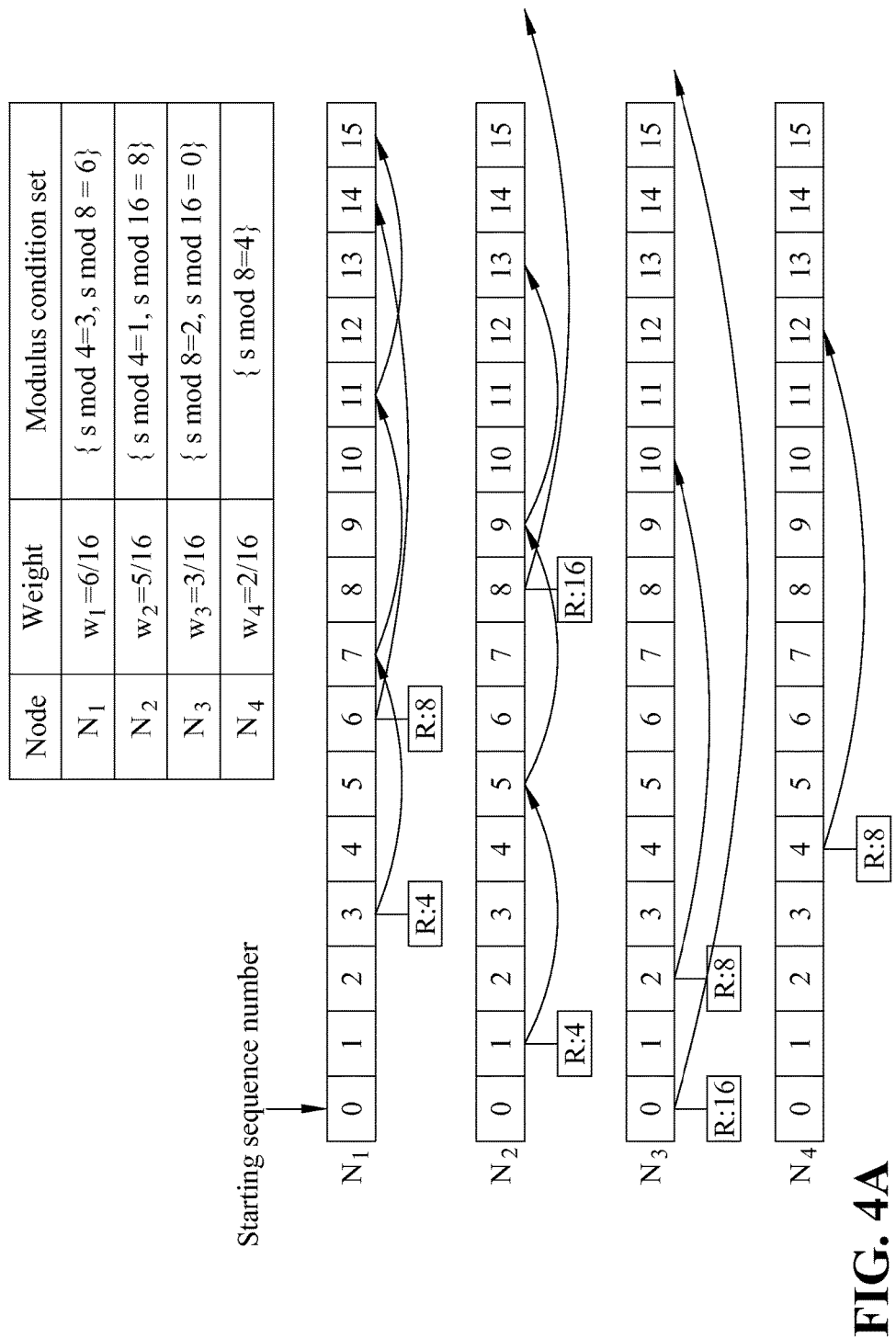

FIGS. 4A-4B show an exemplar of transmitting a substream based on the modulus condition set, in accordance with an embodiment. Following FIG. 2C, the four transmitting nodes $N_1$, $N_2$, $N_3$, $N_4$ in FIG. 4A are assigned with a starting sequence number h and a respective modulus condition set, wherein node $N_1$ is assigned with the modulus condition set as {s mod 4=3, s mod 8=6}, node $N_2$ is assigned with the modulus condition set as {s mod 4=1, s mod 16=8}, node $N_3$ is assigned with the modulus condition set as {s mod 8=2, s mod 16=0}, and node $N_4$ is assigned with the modulus condition set as {s mod 8=4}. First, each node generates an index for each modulus condition in the respective modulus condition set, and the index records the address of the receiving node and the divisor of the modulus condition. As shown in FIG. 4A, take node $N_1$ as an example. An index $I_1$ is generated according to the s mod 4=3 in the modulus condition set (in this example, the initial position of $I_1$ is in an index list of the sequence number 3 corresponding to node $N_1$), and the index $I_i$ records the address of the receiving node R and the divisor 4 of the modulus condition. An index $I_2$ is generated according to the s mod 8=6 in the modulus condition set (in this example, the initial position of $I_2$ is in an index list of the sequence number 6 corresponding to node $N_1$), and the index $I_2$ records the address of the receiving node R and the divisor 8 of the modulus condition.

Then, according to the starting sequence number h and the remainder of the corresponding modulus condition, the index is determined to be placed in an index list corresponding to an initial sequence number of the node (the sequence numbers recorded by each node are h+0, h+1, h+2, $\ldots$, h+15, in this example, the h is omitted from each sequence number). For example, the index $I_1$ is placed in the index list corresponding to the sequence number (h+3) according to the remainder of the corresponding modulus condition (s mod 4=3), and the index $I_2$ is placed in the index list corresponding to the sequence number (h+6) according to the remainder of the corresponding modulus condition (s mod 8=6). Then, based on the progress of the transmitting node obtaining data chunks, the index list of the corresponding sequence number is checked whether an index exists. If so, the transmitting node transmits the data chunks to the receiving node recorded in the index, and the index is shifted according to the divisor of the modulus operation recorded by the index. For example, when the transmitting node $N_1$ obtains the data chunks with sequence number (h+3), the index $I_1$ is retrieved from the index list corresponding to the sequence number (h+3), the data chunk is transmitted to the receiving node R and the index $I_1$ is shifted for four positions and placed in an index list corresponding to the sequence number (h+7). Similarly, when the transmitting node $N_1$ obtains the data chunk with the sequence number (h+6), the data chunk is transmitted to the receiving node R according to the index $I_2$ and the index $I_2$ is shifted for eight positions and placed in an index list corresponding to the sequence number (h+14). FIG. 4B shows the scheduling result for the sub-streams from the four transmitting nodes ($N_1$, $N_2$, $N_3$, and $N_4$). As seen from FIG. 4B, the data chunks of each sub-stream from the four transmitting nodes do not overlap and the ratio of the amount of the data chunks matches the respective weight of the weight set. Also, the receiving node R integrates the sub-streams from the four transmitting nodes ($N_1$, $N_2$, $N_3$, and $N_4$) into a complete stream.

Figure 5:
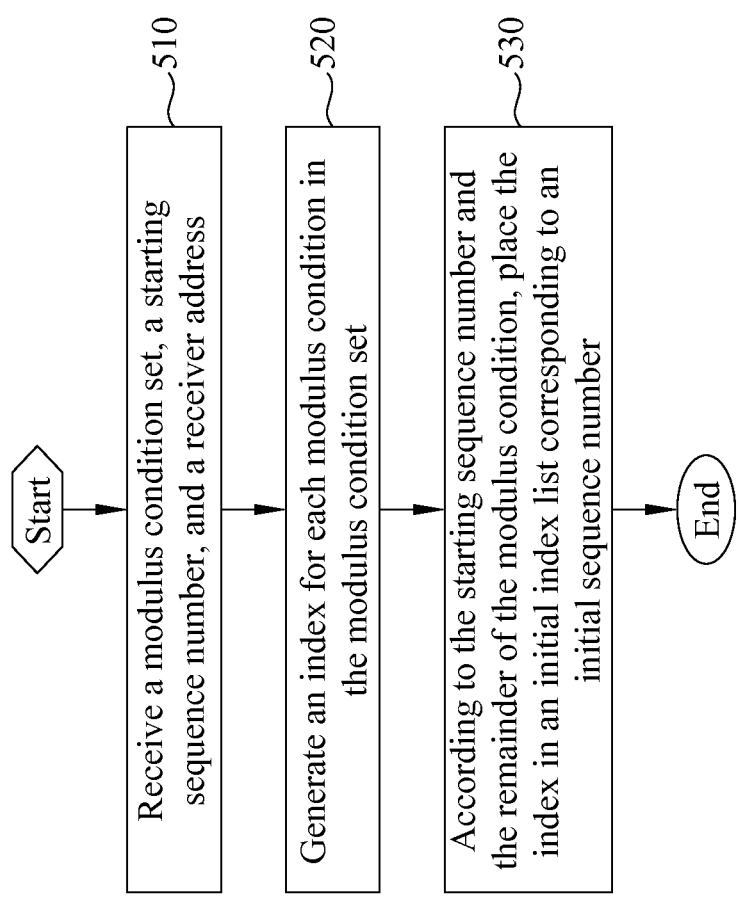
FIG. 5 shows an operation flow of generating and initializing indices based on a modulus condition set, in accordance with an exemplary embodiment.
Figure 6:
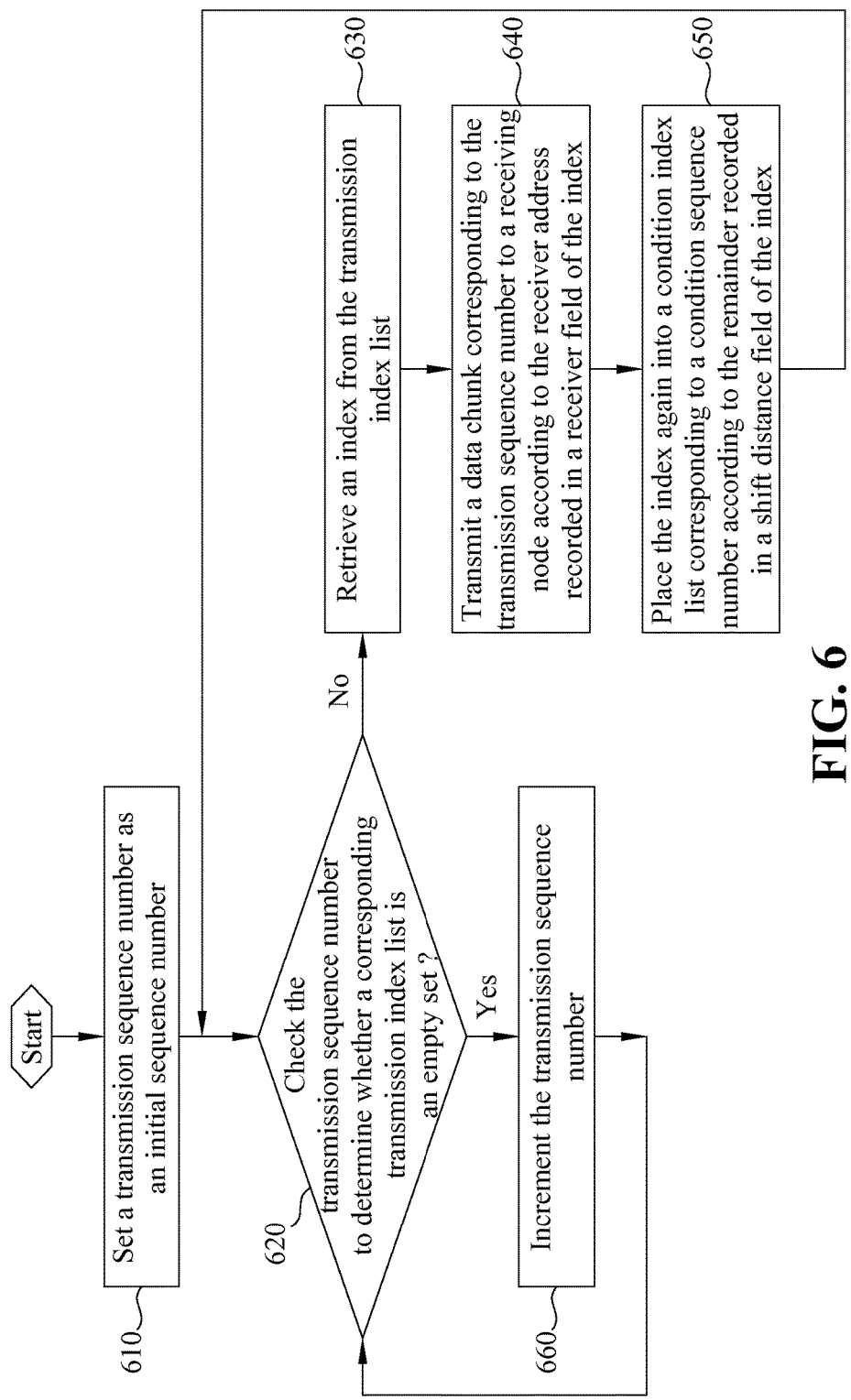
FIG. 6 shows an operation flow of generating and transmitting sub-stream based on the indices, in accordance with an exemplary embodiment.

Accordingly, FIG. 5 shows an operation flow of generating and initializing an index based on a modulus condition set, in accordance with an embodiment; and FIG. 6 shows an operation flow of generating and transmitting sub-stream based on index, in accordance with an exemplary embodiment.

In the operation flow of generating and initializing the index of FIG. 5, first, a modulus condition set, a starting sequence number, and a receiver address, i.e., the address of the receiving node, are received (step 510). Then, for each modulus condition in the modulus condition set, an index is generated (step 520). The index includes a receiver field and a shift distance field, wherein the receiver field records the receiver address and the shift distance field records the divisor of the modulus condition. Finally, according to the starting sequence number and the remainder of the modulus condition, the index is placed in an initial index list corresponding to an initial sequence number (step 530).

In the process of generating and transmitting sub-streams of FIG. 6, first, a transmission sequence number is set as an initial sequence number (step 610). Then, the transmission sequence number is checked to determine whether a corresponding transmission index list is an empty set (step 620). When the corresponding transmission index list is not an empty set, steps 630, 640, 650 are executed and the process returns to step 620; wherein step 630 includes retrieving an index from the transmission index list, step 640 includes transmitting a data chunk corresponding to the transmission sequence number to a receiving node according to the receiver address recorded in the receiver field of the index, and step 650 includes placing the index again into a condition index list corresponding to a condition sequence number according to the remainder recorded in the shift distance field of the index, wherein a difference between the condition sequence number and the transmission sequence number equals to the remainder.

When the transmission index list is an empty set, the transmission sequence number is incremented (step 660) and the process returns to step 620.

Following the operation processes in FIG. 5 and FIG. 6, each node of the network may use, but not limited to, a sequence array or a circular buffer to record the initial sequence number, the transmission sequence number and the condition sequence number. For example, the sequence array includes (2k+1) elements, wherein k is a positive integer. Each element records a sequence number. Assume that the maximum sequence number of the data chunk received by the transmitting node so far is m, corresponding to an element recording a sequence number m in the sequence array, the element is used as a reference position and the k elements in the clockwise direction record consecutive k sequence numbers greater than m, respectively, i.e., (m+1), (m+2), . . . , (m+k); and the k elements in the counterclockwise direction record consecutive k sequence numbers less than m, respectively, i.e., (m−1), (m−2), . . . , (m−k).

The aforementioned step 660 increments the transmission sequence number under the assumption that the transmitting nodes receive the data chunks in an increasing order of sequence number. Therefore, the transmitted data chunks are also in the increasing order of sequence number. When the transmitting nodes do not receive the data chunks in the sequence of increasing data chunks, the transmission sequence number may be set according to the sequence number of the currently received data chunk and, in step 660, when adding the index to an index list corresponding to a sequence number, check to determine whether the data chunk of the sequence number is received. When the data chunk of the sequence number is received, for this index, steps 630, 640 and 650 are executed.

Therefore, according to the exemplary embodiment of the disclosure, the numbers of the data chunks of the sub-streams may be of any ratio. In other words, the weight of the sub-stream may be adapted to any bandwidth allocation ratio, thereby the remaining bandwidth of a node may be fully utilized. Data chunks of all sub-streams do not overlap and are arranged at the receiving node into a complete stream. As such, no redundant data chunks are transmitted and the network bandwidth is efficiently utilized. The computational complexity of determining the data chunks included in a sub-stream is a constant. In other words, the computational time caused by generating sub-streams will not increase as the number of the modulus conditions increases.

Figure 7:
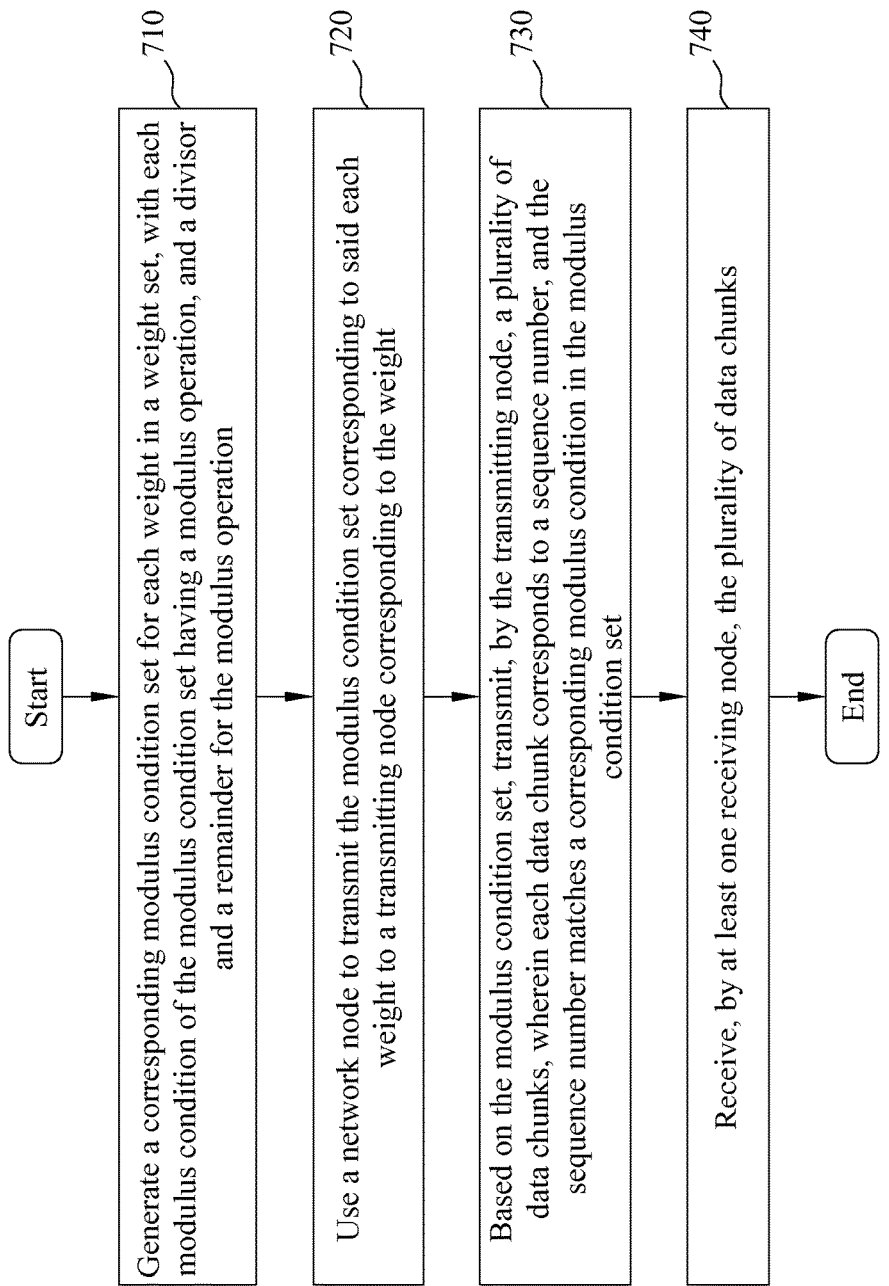
FIG. 7 shows a parallel scheduling method for network data transmission, in accordance with an exemplary embodiment.

Accordingly, FIG. 7 shows a parallel scheduling method for network data transmission, in accordance with an exemplary embodiment. Referring to FIG. 7, the method generates a corresponding modulus condition set for each weight in a weight set, with each modulus condition of the modulus condition set having a modulus operation, and a divisor and a remainder for the modulus operation (step 710); uses a network node to transmit the modulus condition set corresponding to said each weight to a transmitting node corresponding to the weight (step 720); based on the modulus condition set, transmits, by the transmitting node, a plurality of data chunks (step 730), wherein each data chunk corresponds to a sequence number, and the sequence number matches a corresponding modulus condition in the modulus condition set; and receives, by at least one receiving node, the plurality of data chunks (step 740).

According to the exemplary embodiments of the disclosure, the weight set may be determined by the upload bandwidth of the transmitting nodes or the receiving node. The network node may be a transmitting node or a receiving node. The network node is also a device with a computing capability. The network node, transmitting node(s) and at least one receiving node are all nodes on the same network, such as, nodes on a P2P network. In step 710, for each weight of the weight set, how to generate a corresponding modulus condition set is as described in FIG. 3 and related embodiments, and will not be repeated here. In step 730, how to transmit a plurality of data chunks based on the modulus condition is described as in FIG. 5, FIG. 6 and related embodiments, and will not be repeated here.

In the exemplary embodiments of the disclosure, the same weight denominator used by the modulus condition set generated from the weight ratio may be a positive integer having a plurality of factors. FIGS. 8A-8E show an exemplar from generating modulus condition set based on weight set to transmitting sub-streams based on the modulus condition set, in accordance with an embodiment. In FIG. 8A, the weight denominator is set as 18, and the weights corresponding to the two nodes N1, N2 respectively are $w_1=11/18$, $w_2=7/18$. As aforementioned, a factorization is used to define weight factors. The three factors of the weight denominator in the exemplar are 3, 3, and 2, respectively. Therefore, the first weight factor is defined as $1/3$, the second weight factor is $1/9$ and the third weight factor is $1/18$. Then, $w_1$ and $w_2$ are respectively expressed as a linear combination of weight factors, and the following is obtained: $w_1=1\times(1/3)+2\times(1/9)+1\times(1/18)$ and $w_2=1\times(1/3)+1\times(1/18)$.

In FIG. 8B and FIG. 8C, according to weights $w_1$ and $w_2$ in FIG. 8A, the stack is used to generate modulus condition sets of two nodes $N_1$ and $N_2$. First, according to the first factor (3), the positive integer space s is decomposed into three positive integer sub-spaces covered by the three first-order modulus conditions, i.e. s mod 3=0, s mod 3=1, and s mod 3=2. The three modulus conditions are pushed into a stack 821 of FIG. 8B. Then, the modulus conditions, i.e. s mod 3=2 and s mod 3=1, are popped up from the stack 821 and assigned to $w_1$ and $w_2$. That is, the two modulus conditions are added respectively to the modulus condition sets of $w_1$ and $w_2$ of FIG. 8C, and the coefficients of the first weight factor of the weights $w_1$ and $w_2$ are decremented by 1. Then, the remaining modulus condition, i.e. s mod 3=0, in the stack 821 is popped up. At this point, because the coefficient of each weight corresponding to the first weight factor is 0, the s mod 3=0 is decomposed again into three second-order modulus conditions, i.e. s mod 9=0, s mod 9=3, and s mod 9=6, according to the second factor (3), and the decomposed three modulus conditions are pushed into a stack 822 of FIG. 8B.

Then, the modulus conditions s mod 9=6 and s mod 9=3 are popped from the stack 822 and assigned with $w_1$. That is, the two modulus conditions are added respectively to the modulus condition set of $w_1$ and the coefficients of the second weight factor of the weight $w_1$ is decremented by 2. Then, the modulus condition s mod 9=0 in the stack 822 is popped up. At this point, because the coefficient of each weight corresponding to the second weight factor is 0, the s mod 9=0 is decomposed again into two third-order modulus conditions, i.e. s mod 18=0 and s mod 18=9, according to the third factor (2), and the decomposed two modulus conditions are pushed into a stack 823 of FIG. 8B. Finally, the modulus conditions s mod 18=9 and s mod 18=0 are popped up from the stack 823 and assigned to $w_1$ and $w_2$. That is, the two modulus conditions are added respectively to the modulus condition sets of $w_1$ and $w_2$, as shown in FIG. 8C, and the coefficients of the third weight factor of the weights $w_1$ and $w_2$ are decremented by 1.

Following the modulus condition sets corresponding to the weights $w_1$ and $w_2$ of two nodes $N_1$ and $N_2$, FIG. 8D describes the process of the two nodes $N_1$ and $N_2$ transmitting sub-streams, according to the modulus condition sets as the flowcharts described in FIG. 5 and FIG. 6. As shown in FIG. 8D, according to the process in FIG. 5, assume that the starting sequence number of two nodes $N_1$ and $N_2$ is h. take node $N_1$ as an example. An index $I_1$ is generated according to the s mod 3=2 of the modulus condition set, and the index $I_1$ records the address of the receiving node R and the divisor 3 of the modulus condition (shown as R:3 in the FIG. 8D). The index $I_1$ is placed in an index list corresponding to the sequence number (h+2) according to the remainder 2 of the modulus condition (in FIG. 8D, each sequence number starts from h, and thus the symbol h is omitted.) An index $I_2$ is generated according to the s mod 9=3 of the modulus condition set, and the index $I_2$ records the address of the receiving node R and the divisor 9 of the modulus condition (shown as R:9 in FIG. 8D). The index $I_2$ is placed in the index list corresponding to the sequence number (h+3) according to the remainder 3 of the modulus condition. An index $I_3$ is generated according to the s mod 9=6 of the modulus condition set, and the index $I_3$ records the address of the receiving node R and the divisor 9 of the modulus condition (shown as R:9 in FIG. 8D). The index $I_3$ is placed in the index list corresponding to the sequence number (h+6) according to the remainder 6 of the modulus condition. An index $I_4$ is generated according to the s mod 18=9 of the modulus condition set, and the index $I_4$ records the address of the receiving node R and the divisor 18 of the modulus condition (shown as R:18 in FIG. 8D). The index $I_4$ is placed in the index list corresponding to the sequence number (h+9) according to the remainder 9 of the modulus condition. According to the process in FIG. 6, when the transmitting nodes $N_1$ and $N_2$ receive a data chunk, the nodes check whether an index exists in the index list corresponding to the sequence number of the data chunk. If so, the nodes transmit the data chunk to the receiving node recorded by the index and shift the index according to the divisor of the modulus condition recorded by the index. In other words, according to the divisor of the modulus operation of a modulus condition, the node determines a shift distance of an index in a sequence array when the index is replaced again into the sequence array.

Following FIG. 8D, FIG. 8E shows the result of the sub-stream transmission scheduling of two nodes $N_1$ and $N_2$, according to the operation flow of generating and transmitting sub-streams described in FIG. 5 and FIG. 6. As seen from FIG. 8E, the data chunks of each sub-stream from the two transmitting nodes $N_1$ and $N_2$ do not overlap and their amount ratios of the data chunks matches the weights of the weight set. Also, the sub-streams transmitted by the two transmitting nodes $N_1$ and $N_2$ are integrated at the receiving node R into a complete stream.

Figures 9A, 9B:
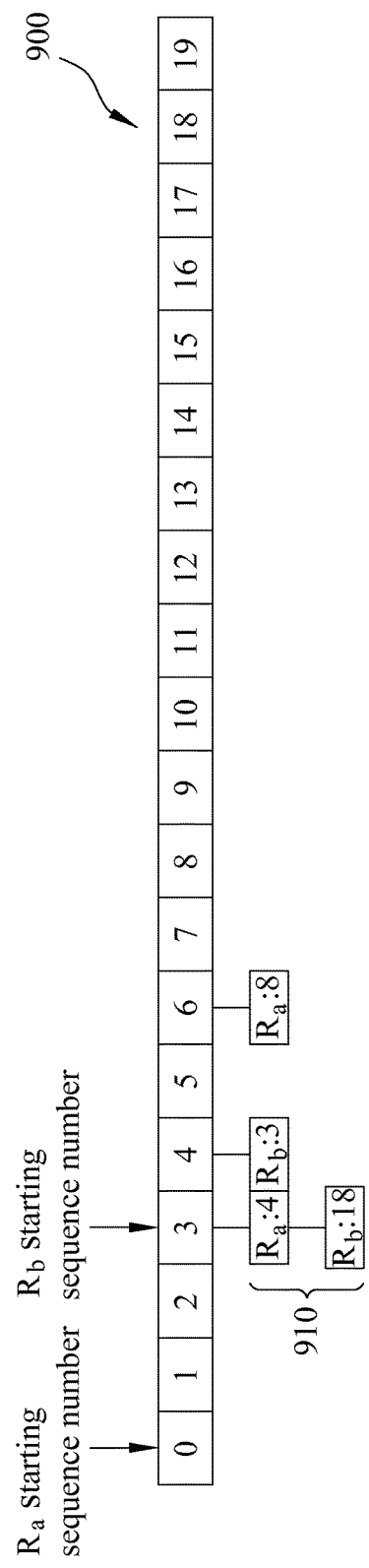
FIGS. 9A-9B show an exemplar of a transmitting node generating and initializing indices based on the modulus condition sets corresponding to a plurality of receiving nodes, in accordance with an exemplary embodiment.

FIGS. 9A-9B show an exemplar of a transmitting node generating and initializing indices based on the modulus condition sets corresponding to a plurality of receiving nodes, in accordance with an exemplary embodiment. The exemplar of FIG. 9A and FIG. 9B uses two receiving nodes as example, wherein FIG. 9A shows the modulus condition sets of the sub-streams of the two receiving nodes $R_a$ and $R_b$. Following the modulus condition sets of FIG. 9A, FIG. 9B describes the generation and initialization of the index of the two receiving nodes $R_a$ and $R_b$, according to the operation flow of FIG. 5.

Please refer to both the exemplars in FIG. 9A and FIG. 9B. The transmitting node receives a starting sequence number and a modulus condition set from the two receiving nodes $R_a$ and $R_b$, respectively. Assume that the receiving node $R_a$ requests the starting sequence number as $h_a$, and the modulus condition set is {s mod 4=3, s mod 8=6}. An index $I_{a,1}$ is generated according to the modulus condition s mod 4=3, and records the address of receiving node $R_a$ and the divisor 4 of the modulus condition (shown as $R_a$:4 in the figure), and the index $I_{a,1}$ is placed in an index list corresponding to the sequence number ($h_a$+3) of the sequence array 900 according to the starting sequence number $h_a$ and the remainder 3 of the modulus condition (each sequence number in the sequence array in FIG. 9B starts with $h_a$, and thus the symbol $h_a$ is omitted). Similarly, an index $I_{a,2}$ is generated according to the modulus condition s mod 8=6, and records the address of receiving node $R_a$ and the divisor 8 of the modulus condition (shown as $R_a$:8 in the figure), and the index $I_{a,2}$ is placed in an index list corresponding to the sequence number ($h_a$+6) of the sequence array 900 according to the remainder 6 of the modulus condition.

Assume that the receiving node $R_b$ requests the starting sequence number as $h_b$, (in this exemplar, $h_b=h_a+3$), and the modulus condition set is {s mod 3=1, s mod 18=0}. An index $I_{b,1}$ is generated according to the modulus condition s mod 3=1, and records the address of receiving node $R_b$ and the divisor 3 of the modulus condition (shown as $R_b$:3 in the FIGURE), and the index $I_{b,1}$ is placed in an index sequence corresponding to the sequence number ($h_b$+1), i.e., ($h_a$+4), of the sequence array 900 according to the remainder 1 of the modulus condition and the starting sequence number $h_b$ (each sequence number in the sequence array in FIG. 9B starts with $h_a$, and thus the symbol $h_a$ is omitted). Similarly, an index $I_{b,2}$ is generated according to the modulus condition s mod 18=0, and records the address of receiving node $R_b$ and the divisor 18 of the modulus condition (shown as $R_b$:18 in the FIGURE), and the index $I_{b,2}$ is placed in an index list corresponding to the sequence number $h_b$, i.e., ($h_a$+3) of the sequence array 900 according to the remainder 0 of the modulus condition and the starting sequence number $h_b$. At this point, index $I_{a,1}$ and index $I_{b,2}$ are placed in the index list corresponding to the sequence number ($h_a$+3) of the sequence array, and therefore, the index list 910 corresponding to the sequence number ($h_a$+3) includes two indexes, i.e., index $I_{a,i}$ and index $I_{b,2}$.

According to FIG. 9B, the details of the transmitting nodes generating and transmitting a plurality of sub-streams to corresponding receiving nodes are described in FIG. 6, and thus are omitted here. According to the operation flow of FIG. 6, in placing the index again into a condition index list, it is possible that different indexes corresponding to different receiving nodes are placed in the index list corresponding to the same sequence number.

Figure 10:
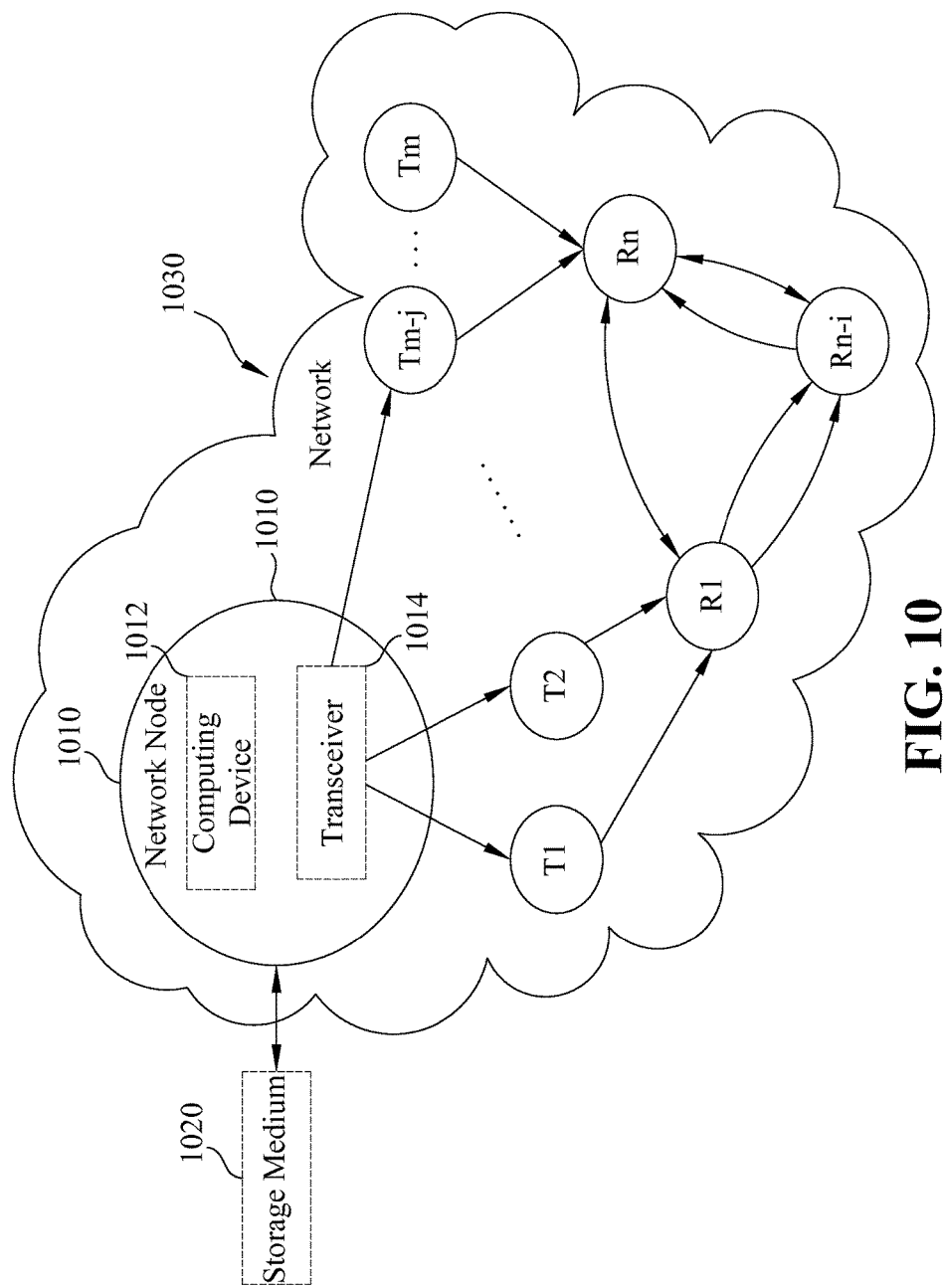
FIG. 10 shows a parallel scheduling system for network data transmission, in accordance with an exemplary embodiment.

FIG. 10 shows a parallel scheduling system for network data transmission, in accordance with an exemplary embodiment. Referring to FIG. 10, the parallel scheduling system for network data transmission may comprise a network node 1010. The network node 1010 may use, such as, a computing device 1012 to generate a corresponding modulus condition set for each weight in a weight set, with each modulus condition of the modulus condition set having a modulus operation, and a divisor and a remainder for the modulus operation. The network node 1010 may use, such as, a transceiver 1014 to transmit each modulus condition set corresponding to each weight to a transmitting node corresponding to the weigh, and may use, such as, a storage medium 1020 to store and maintain a plurality of modulus condition sets generated by the network node 1010. Based on the modulus condition set, the transmitting node transmits a plurality of data chunks to one or more receiving nodes (R1-Rn), wherein each data chunk corresponding to a sequence number, and the sequence number matches a corresponding modulus condition in the modulus condition set.

According to the exemplary embodiments of the disclosure, the network node 1010, the plurality of transmitting nodes (T1, T2, . . . , Tm) and one ore more receiving nodes (R1, R2, . . . , Rn) are all connected to a same network 1030, such as, a P2P network. The network node 1010 may include a computing device 1012, and also may include a transceiver 1014. In other words, the network node 1010 is at least a device with a computing capability and a transceiving capability. The storage medium 1020 may be placed in the network node 1010, or a storage medium external to the network node 1010. The network node 1010 may execute the operations in FIG. 3 to generate modulus condition sets. The transmitting node may execute the operations in FIG. 5 to generate and initialize an index, and may execute the operations in FIG. 6 to perform each sub-stream transmission. The details will not be repeated here.

Figure 11A:
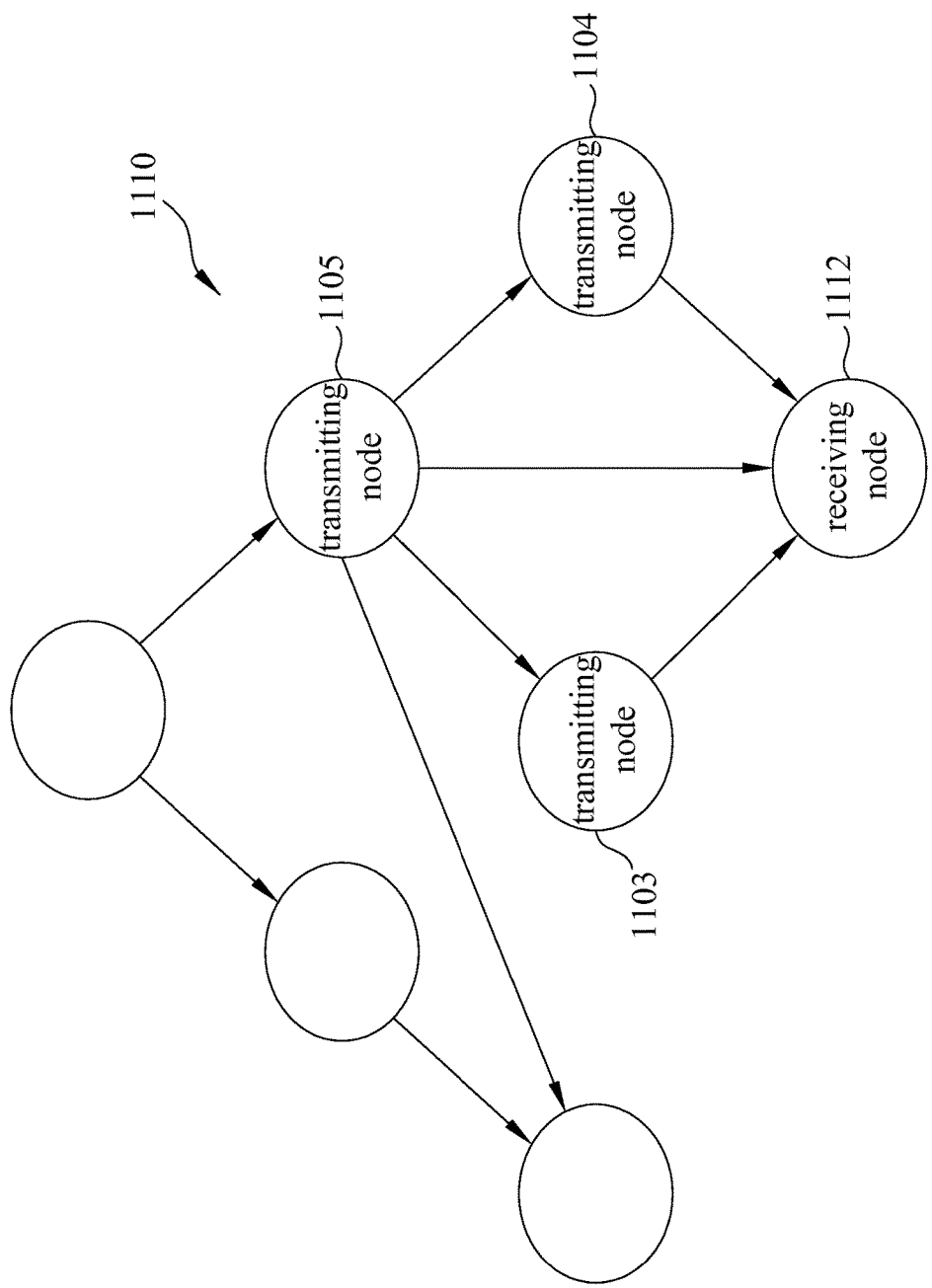
FIGS. 11A-11C show three application exemplars of sub-stream transmission, in accordance with an exemplary embodiment.
Figure 11B:
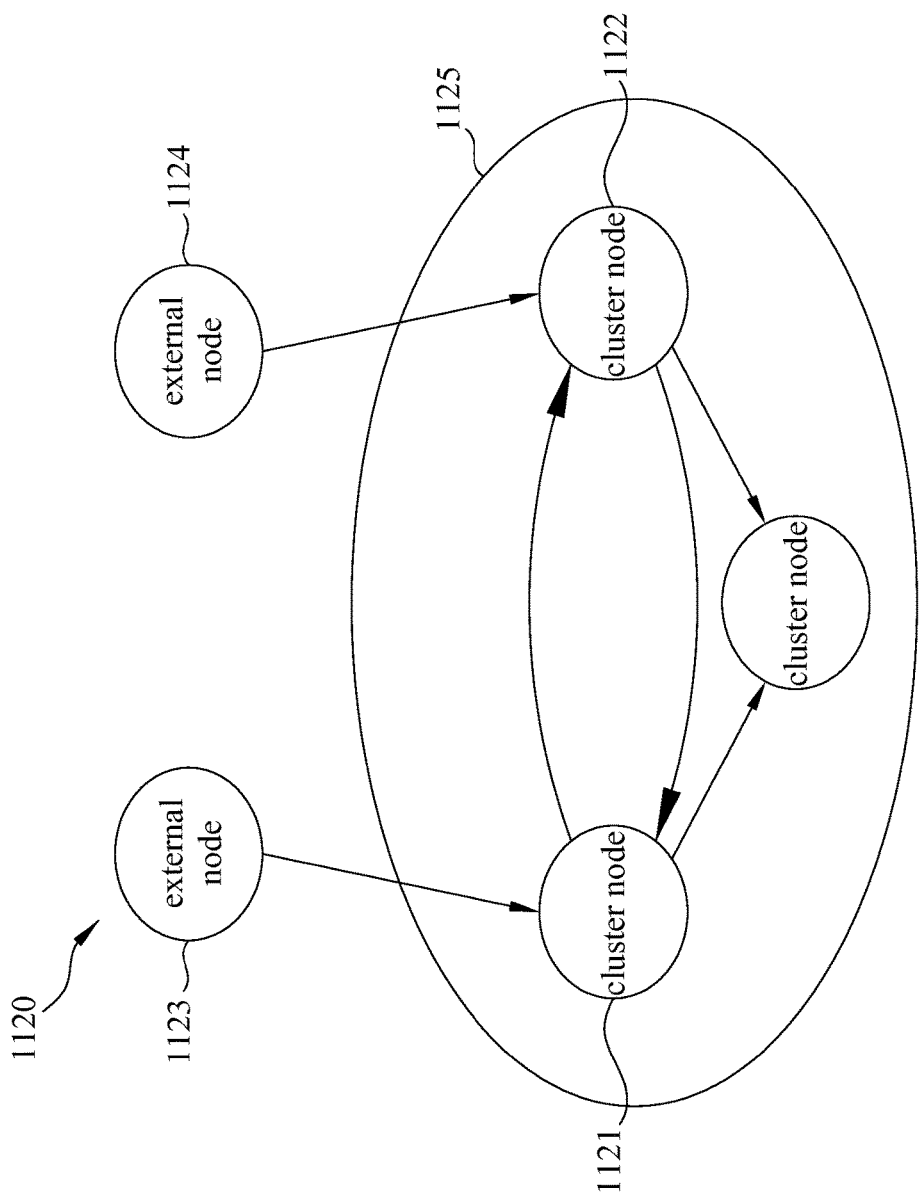
Figure 11C:
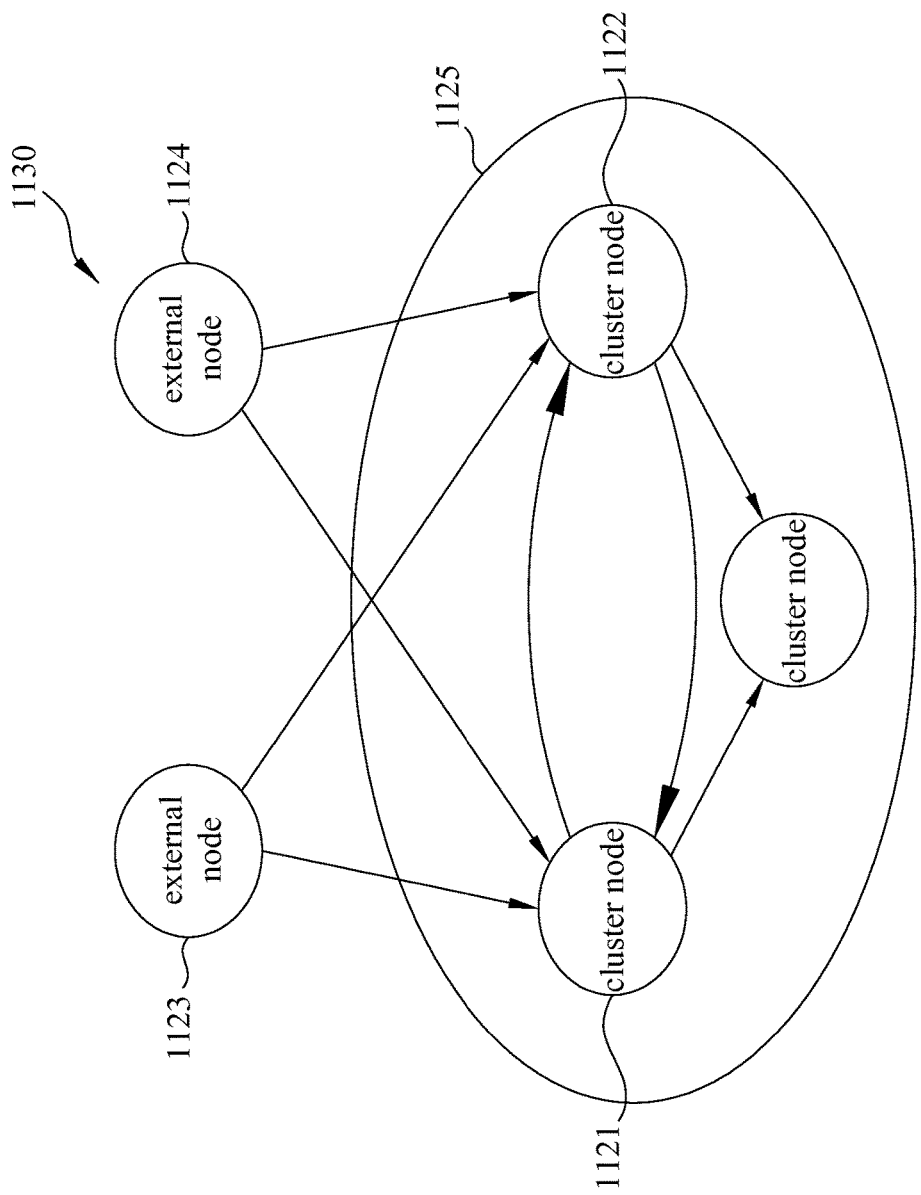

FIGS. 11A-11C show three application exemplars of sub-stream transmission, in accordance with an exemplary embodiment. The exemplar of FIG. 11A is applied to a tree-based/mesh-based P2P network topology 1110, wherein a receiving node 1112 may receive the sub-stream from a plurality of leaf nodes (such as, transmitting nodes 1103 and 1104) or internal nodes (such as a transmitting node 1105). The weight may be determined by the remaining available upload bandwidth of the transmitting nodes 1103-1105. The exemplar of FIG. 11B is applied to a cluster-based P2P network topology 1120, wherein the cluster node may receive the sub-stream from an external node and exchanges the sub-stream with other nodes. For example, a cluster node 1121 and a cluster node 1122 receive the sub-stream respectively from an external node 1123 and an external node 1124. The cluster node 1121 and the cluster node 1122 of a cluster 1125 transmit the sub-stream to other cluster nodes. In the exemplar of FIG. 11B, the weight may be determined by the upload bandwidth of the receiving nodes (cluster node 1121 and cluster node 1122). The exemplar of FIG. 11C is applied to another cluster-based P2P network topology 1130, wherein the cluster node may receive the sub-stream from a plurality of external nodes and exchanges the sub-stream with other nodes in the cluster. For example, the cluster node 1121 receives the sub-stream from two external nodes 1123, 1124. The cluster node 1122 also receives the sub-stream from the two external nodes 1123, 1124. The cluster node 1121 and the cluster node 1122 of the cluster 1125 transmit the sub-stream to other cluster nodes. In the exemplar of FIG. 11C, the weight may be determined by the upload bandwidth of the receiving nodes (cluster node 1121 and cluster node 1122) and the transmitting nodes (external node 1123 and external node 1124).

In summary, according to the exemplary embodiments of the present disclosure, a parallel scheduling method and system for network data transmission is provided. The parallel scheduling technique uses a plurality of modulus conditions to define the sequence numbers of the data chunks of each sub-stream, including generating a plurality of modulus condition sets based on a weight ratio, and transmitting the sub-streams based on the modulus condition sets. The technique decomposes the modulus condition and assigns the modulus condition to a corresponding weight based on the factors of the weight denominator, uses a register to record the yet unassigned modulus condition, and generates a modulus condition set corresponding to each weight. In addition, the technique generates an index for each modulus condition, determines an initial position of the index according to a remainder of the modulus condition and determines a shift distance of the index according to a divisor. The technique transmits a plurality of data chunks to corresponding receiving node(s) according to the index. The technique may be applied to multimedia streaming services.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A parallel scheduling method for network data transmission, comprising:
   generating a corresponding modulus condition set for each weight in a weight set, with each modulus condition of the modulus condition set having a modulus operation, and a divisor and a remainder for the modulus operation;
   using a network node to transmit the modulus condition set corresponding to said each weight to a transmitting node corresponding to the weight;
   for each modulus condition in the modulus condition set, generating an index;
   according to a starting sequence number and the remainder of the modulus condition, placing the index in an initial index list corresponding to an initial sequence number;
   based on the modulus condition set, transmitting, by the transmitting node, a plurality of data chunks, wherein each data chunk corresponds to a sequence number, and the sequence number matches a corresponding modulus condition in the modulus condition set; and
   receiving, by at least one receiving node, the plurality of data chunks.

2. The method as claimed in claim 1, wherein the network node, the transmitting node and the at least one receiving node are all nodes on a same network, and the network node is a device with a computing capability.

3. The method as claimed in claim 1, wherein the generating the corresponding modulus condition set further includes:
   determining a weight set, wherein each weight in the weight set is a fraction with a same weight denominator, and a sum of all the weights in the weight set is 1;
   transforming each weight into a linear combination of a plurality of weight factors;
   storing at least one modulus condition into a storage medium;
   retrieving a modulus condition from the at least one modulus condition in the storage medium, when a weight has a coefficient of a weight factor corresponding to the modulus condition greater than 0, adding the modulus condition to the modulus condition set corresponding to the weight and decreasing the coefficient by 1; otherwise, decomposing the modulus condition according to a factor of the weight denominator into a plurality of modulus conditions and storing into the storage medium; and
   repeating the above step, until each coefficient of the weight factor of each weight in the weight set becomes 0;
   wherein the plurality of modulus conditions include a plurality of modulus operations, and the plurality of modulus operations share a common divisor and have a plurality of different remainders.

4. The method as claimed in claim 3, wherein the weight denominator is a multiplication of a plurality of factors.

5. The method as claimed in claim 4, wherein the plurality of factors is expressed as a first factor $f_1, \ldots,$ an $X^{th}$ factor $f_X$, $X \geq 2$, each weight factor $P_x$ of the plurality of weight factors $P_1, \ldots, P_X$ is defined as:
   when x=1, $P_1 = 1/f_1$;
   when $2 \leq x \leq X$, $P_x = 1/\Pi_{y=1}^{x} f_y$, $f_y$ is the $y^{th}$ factor of the plurality of factors, $1 \leq y \leq x$, $\Pi$ is a consecutive multiplication operation, and $\Pi_{y=1}^{x} f_y$ is the multiplication from the first factor $f_1$ to the $x^{th}$ factor $f_x$.

6. The method as claimed in claim 3, wherein decomposing the modulus condition according to the factor of the weight denominator into the plurality of modulus conditions further includes:
   the number of the plurality of modulus conditions after decomposition being equal to the factor of the weight denominator, the common divisor of the plurality of modulus conditions being a multiplication product of the divisor of the modulus operation corresponding to the retrieved modulus condition and the factor of the weight denominator, the plurality of different remainders of the plurality of modulus conditions being an increasing arithmetic sequence starting with the remainder of the modulus operation corresponding to the retrieved modulus condition, and with the divisor of the modulus operation corresponding to the retrieved modulus condition as an incremental step of the increasing arithmetic sequence.

7. The method as claimed in claim 1, wherein the weight set is determined by upload bandwidths of the plurality of transmitting nodes, or the at least one receiving node, or the plurality of transmitting nodes and the at least one receiving node.

8. The method as claimed in claim 1, wherein the index records an address of the at least one receiving node, and the divisor of the modulus operation of the modulus condition.

9. The method as claimed in claim 1, wherein the transmitting, by the transmitting node, the plurality of data chunks further includes generating and transmitting a sub-stream, and generating and transmitting the sub-stream further includes:
   setting a transmission sequence number as the initial sequence number;
   checking the transmission sequence number to determine whether a transmission index list corresponding to the transmission sequence number is an empty set;
   when the corresponding transmission index list is not the empty set, retrieving an index from the transmission index list, transmitting a data chunk corresponding to the transmission sequence number to the at least one receiving node, and placing the index again into a condition index list corresponding to a condition sequence number, repeating checking the transmission sequence number to determine whether a transmission index list corresponding to the transmission sequence number is an empty set until the transmission index list becomes an empty set; and
   when the transmission index list is the empty set, incrementing the transmission sequence number and returning to the step of checking the transmission sequence number to determine whether a transmission index list corresponding to the transmission sequence number is the empty set.

10. The method as claimed in claim 9, wherein a difference between the condition sequence number and the transmission sequence number equals to the divisor of the modulus operation of the modulus condition.

11. The method as claimed in claim 1, wherein the method uses a stack or a queue to record the yet unassigned at least one modulus condition when generating the corresponding modulus condition set for the each weight.

12. A parallel scheduling system for network data transmission, comprising:
   a network node that generates a corresponding modulus condition set for each weight in a weight set, with each modulus condition of the modulus condition set having a modulus operation, and a divisor and a remainder for the modulus operation, wherein the network node transmits the modulus condition set corresponding to said each weight to a transmitting node corresponding to the weight and uses a storage medium to store and maintain a plurality of modulus condition sets generated by the network node;

wherein the transmitting node generates an index for each modulus condition in the modulus condition set, places the index in an initial index list corresponding to an initial sequence number according to a starting sequence number and the remainder of the modulus condition and transmits a plurality of data chunks to one or more receiving nodes based on the modulus condition set, wherein each data chunk corresponding to a sequence number, and the sequence number matches a corresponding modulus condition in the modulus condition set.

13. The system as claimed in claim 12, wherein the network node, a plurality of transmitting nodes and the one or more receiving nodes are all connected to a network.

14. The system as claimed in claim 12, wherein the network node is at least a device with a computing capability and a transceiving capability.

15. The system as claimed in claim 12, wherein the network node transforms each weight of the weight set into a linear combination of a plurality of weight factors.

16. The system as claimed in claim 12, wherein the network node uses a stack or a queue to record the yet unassigned at least one modulus condition when generating corresponding modulus condition set, and decomposes the yet unassigned at least one modulus condition into a plurality of modulus conditions, the plurality of modulus conditions after decomposition are assigned to at least one corresponding weight or placed to the stack or the queue.

17. The system as claimed in claim 12, wherein the transmitting node determines an initial position in a sequence array for the index according to the remainder of the modulus operation of said each modulus condition, and determines a shift distance of the index when the index is placed again into the sequence array according to the divisor of the modulus operation of each modulus condition.

18. The system as claimed in claim 13, wherein the network is a peer-to-peer network.

19. The system as claimed in claim 12, wherein the weight set is determined by upload bandwidths of a plurality of transmitting nodes, or the at least one receiving node, or the plurality of transmitting nodes and the at least one receiving node.

* * * * *